(12) United States Patent
Escobedo

(10) Patent No.: US 11,621,600 B2
(45) Date of Patent: Apr. 4, 2023

(54) STATOR FOR AN ELECTRIC MACHINE

(71) Applicant: SEG Automotive Germany GmbH, Stuttgart (DE)

(72) Inventor: David Rodriguez Escobedo, Cantabria (ES)

(73) Assignee: SEG AUTOMOTIVE GERMANY GmbH, Stuttgart (DE)

( * ) Notice: Subject to any disclaimer, the term of this patent is extended or adjusted under 35 U.S.C. 154(b) by 39 days.

(21) Appl. No.: 17/474,496

(22) Filed: Sep. 14, 2021

(65) Prior Publication Data

US 2022/0103039 A1 Mar. 31, 2022

(30) Foreign Application Priority Data

Sep. 14, 2020 (DE) .......................... 102020123903.3

(51) Int. Cl.
*H02K 3/50* (2006.01)
*H02K 3/52* (2006.01)
(Continued)

(52) U.S. Cl.
CPC .................. *H02K 3/50* (2013.01); *H02K 3/28* (2013.01); *H02K 3/52* (2013.01); *H02K 15/0037* (2013.01)

(58) Field of Classification Search
CPC ........ H02K 3/50; H02K 3/52; H02K 15/0037; H02K 3/522; H02K 3/12; H02K 3/28;
(Continued)

(56) References Cited

U.S. PATENT DOCUMENTS 6,791,228 B2  9/2004  Hashiba et al.
6,800,973 B2 * 10/2004  Futami ................ H01R 4/2458
                                                     310/71
(Continued)

FOREIGN PATENT DOCUMENTS

DE  102017106004 A1  9/2017
DE  102018007554 A1  5/2019
(Continued)

OTHER PUBLICATIONS

French Patent Application No. 2109510 Search Report and Opinion dated Sep. 6, 2022, 5 pages.
(Continued)

*Primary Examiner* — Alexander A Singh
(74) *Attorney, Agent, or Firm* — Cozen O'Connor

(57) ABSTRACT

The invention relates to a stator (100) for an electric machine having a stator core (102) and at least one winding (110) which has a winding head (120) protruding axially beyond the stator core (102), wherein the winding head (120) comprises portions of the winding which form reversals of the winding wires, winding connection lines (126) for energizing the winding (110) and at least one radially outwardly arranged first set of winding portions (127) and one radially inwardly arranged second set of winding portions (128) spaced apart from the first set, wherein the portions of the winding connection lines (126) each run in the circumferential direction, do not protrude axially beyond the first (127) and the second (128) sets of winding portions and are arranged radially between and fixed by the first (127) and the second (128) sets of winding portions. The invention also relates to a method for producing such a stator (100) and to an electric machine having such a stator (100).

15 Claims, 2 Drawing Sheets

(51) Int. Cl.
*H02K 15/00* (2006.01)
*H02K 3/28* (2006.01)

(58) Field of Classification Search
CPC ........ H02K 3/04; H02K 15/085; H02K 5/225;
H02K 5/22; H02K 2203/09; H02K 3/00
USPC ......... 310/71, 200, 202, 203, 204, 205, 206,
310/207, 208
See application file for complete search history.

(56) References Cited

U.S. PATENT DOCUMENTS

| | | |
|---|---|---|
| 2003/0218394 A1 | 11/2003 | Hashiba et al. |
| 2009/0140596 A1 | 6/2009 | Kaiser et al. |
| 2009/0269222 A1 | 10/2009 | Fukasaku et al. |
| 2010/0283349 A1 | 11/2010 | Wolf et al. |
| 2017/0025913 A1* | 1/2017 | Nagahiro ............... H02K 15/02 |
| 2019/0097484 A1* | 3/2019 | Kaneshige ......... H02K 15/0068 |

FOREIGN PATENT DOCUMENTS

| | | |
|---|---|---|
| EP | 2273654 A | 1/2011 |
| JP | 2008295162 A | 12/2008 |
| WO | WO 2020079408 A1 | 4/2020 |

OTHER PUBLICATIONS

Spanish Patent Application No. 202130817 Search dated Feb. 25, 2022, 1 page.
German Patent Application No. 102020123903.3 Search dated Aug. 7, 2021, 1 page.

* cited by examiner

STATOR FOR AN ELECTRIC MACHINE

The present invention relates to a stator for an electric machine and to a method for producing such a stator and to an electric machine having such a stator.

BACKGROUND OF THE INVENTION

Stators for electric machines usually have a stator core made of a magnetically soft and thus easily polarizable material, for example soft iron. The stator core often has a substantially hollow cylindrical shape overall, wherein grooves running in a direction parallel to the corresponding cylinder axis can be introduced along the inner circumference of the hollow cylinder. A winding made of electrically conductive wire, for example copper or aluminum wire, is generally introduced into said grooves. At the axially outer ends of the stator core, the direction of the winding wire can be reversed so that the wire runs into one slot in one direction and in particular can run back into another, for example adjacent, slot. The reversals, which are arranged axially outside the stator core or its slots, form a winding head as a whole. Associated connection lines of the winding can be fixed to the winding head, for example by sewing or tying or adhesive bonding.

DISCLOSURE OF THE INVENTION

According to the invention, a method for producing a stator for an electric machine, a stator and an electric machine having the features of the independent claims are proposed. Advantageous embodiments are the subject of the dependent claims and the following description.

The stator according to the invention for an electric machine has a stator core and at least one winding. The winding has a winding head which protrudes axially beyond the stator core and which is formed by the regions of the winding which form the reversals of the winding wires. In addition to these reversals, the winding head also has winding connection lines, wherein the reversals have at least one radially outwardly arranged first set of winding portions and one radially inwardly arranged second set of winding portions spaced apart from the first set. Portions of the winding connection lines which are each arranged running in the circumferential direction are arranged between the first and the second sets of winding portions and do not protrude axially beyond said sets and are fixed by said sets, in particular in the axial and/or radial direction. As a result, the freedom of movement of the connection lines can be restricted particularly efficiently and effectively, so that the risk of damage to the conductive wire is minimized during assembly and operation. In this way, additional fastening means, such as in particular binding cords or binding wires, can advantageously be avoided. In some embodiments, the connection lines are optionally additionally fixed by sewing and/or tying and/or adhesive bonding and/or potting. This makes the connection lines particularly secure.

In some embodiments, the winding head has at least one further set of winding portions between the first set of winding portions and the second set of winding portions, wherein the portions of the winding connection lines protrude in the axial direction beyond the at least one further set, but are arranged radially in the same plane as the at least one further set. As a result, a higher copper filling of the stator can be achieved overall.

The portions of the winding connection lines preferably run at least over two slot widths and/or at least 5°, 10°, 15° or 30° in the circumferential direction along the winding head. As a result, different phases of the winding can be safely guided to the associated connections or power connectors. In particular, this eliminates the need to redesign proven connection concepts, so that the remaining stator components can be used or optimized independently of the present invention.

In advantageous embodiments of the present invention, the winding head has a variation of an axial height or axial extension of at most 20%, 15%, 10% or 5% over the entire circumference of the stator. In other words, the winding head is substantially the same height over the entire circumference, so that particularly small manufacturing tolerances and particularly compact installation dimensions can be implemented.

The fixed portions of the winding connection lines preferably do not protrude radially outwardly beyond the first set or radially inwardly beyond the second set of winding portions at any point. This can minimize the risk of damage during assembly and operation of the electric machine.

A winding wire from which the winding is made preferably has a minimum cross-sectional area of more than 0.5 $mm^2$, 1 $mm^2$, 2 $mm^2$ or 4 $mm^2$. This ensures sufficient stability of the winding portions, which fix the portions of the winding connection lines, even without additional fixing.

Further aspects of the invention relate to a method for producing such a stator and to an electric machine having such a stator. These each benefit in an analogous manner from the features and advantages of the stator. Therefore, features and advantages explained in relation to one aspect of the invention apply analogously to the other aspects and their advantageous embodiments.

Further advantages and embodiments of the invention can be found in the description and the accompanying drawings.

The invention is shown schematically in the drawings on the basis of embodiments and is described below with reference to the drawings.

EMBODIMENT(S) OF THE INVENTION

Figure 1:
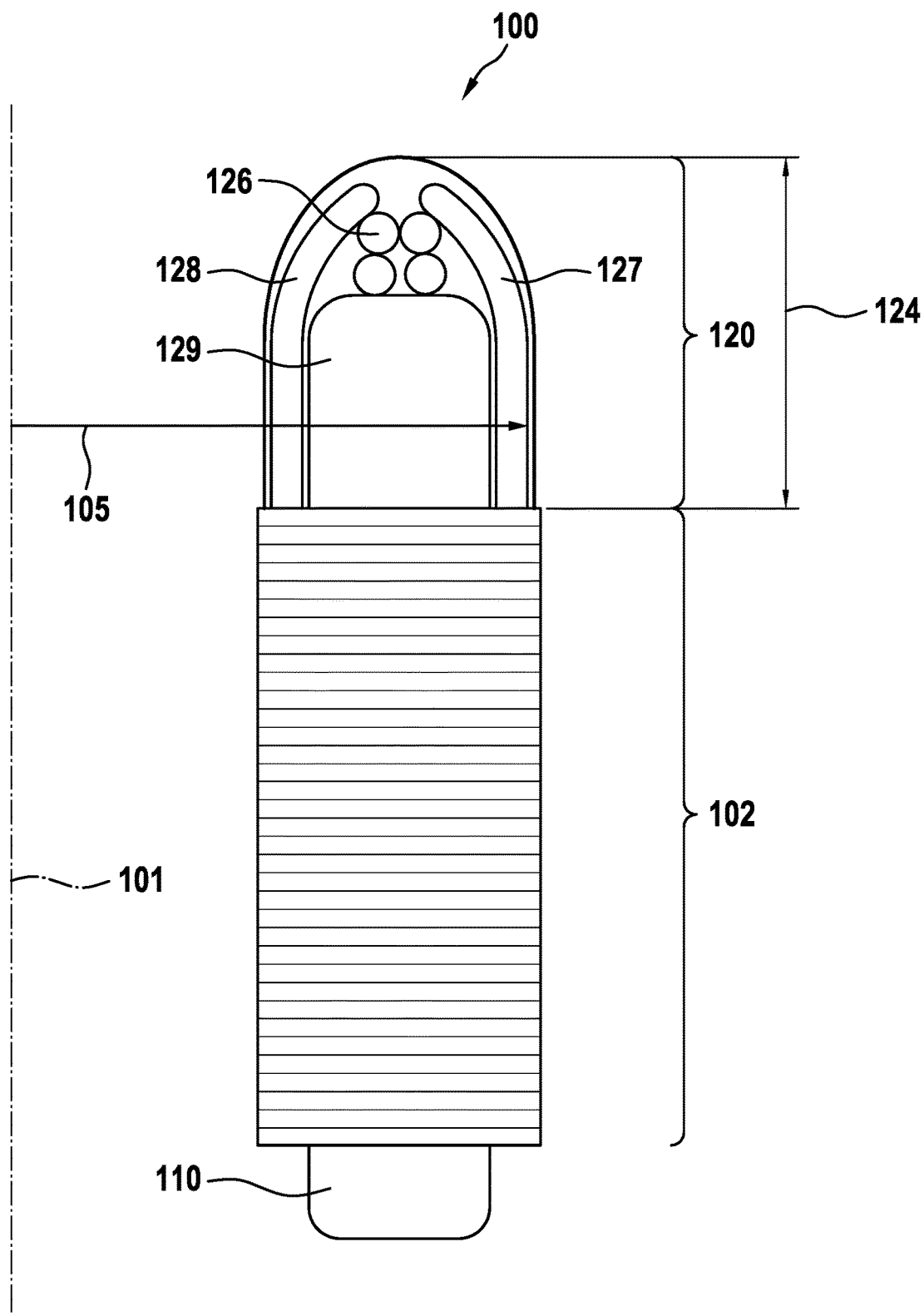
FIG. 1 shows an advantageous embodiment of a stator according to the invention in a schematic representation.

In FIG. 1, an embodiment of a stator according to the invention is shown schematically in the form of half a longitudinal section and represented as a whole by 100.

The stator 100 is substantially circular, wherein FIG. 1 depicts a portion along a radial plane. A radius 105 and a central axis 101 are shown for illustrative purposes.

The stator 100 has a stator core 102, for example a laminated iron core, and a winding 110, which can be wound for example from enamel-insulated aluminum or copper wire. Individual wires of the winding 110 run in slots of the stator core 102, leave said slots on the axial side, form reverse loops or reverse portions and reenter other slots on the axial side.

The winding 110 has a winding head 120 which, in FIG. 1, is arranged in a direction parallel to the axis 101 above the stator core 102 and is formed from the reverse portions of the winding. The winding head 120 here substantially consists of first winding portions 127, second winding portions 128, further winding portions 129, as well as portions of winding connection lines 126. The winding portions 126, 127 and 128 are formed from respective reverse loops of the winding wire of the winding 110, while the portions of the winding connection lines 126 run substantially perpendicular to the plane of the drawing in the circumferential direction of the stator 100 and are formed from end portions of the respective winding wire which are used to energize the winding 110.

The portions of the winding connection lines 126 are arranged in the radial direction 105 between the first 127 and second 128 winding portions and lie in the axial direction above the further winding portions 129. In the axial direction, the portions of the winding connection lines do not protrude beyond the first and second winding portions 127, 128, so that a region in which the portions of the winding connection lines 126 are located is delimited radially outwardly by the first winding portions 127 and radially inwardly by the second winding portions 128. This advantageously results in a fixation of the portions of the winding connection lines 126 in the radial direction by the first and second winding portions, which is further reinforced by the fact that the first winding portions 127 are bent radially inwardly in a region around their respective axial apex and the second winding portions 128 are bent radially outwardly in a region around their respective axial apex, so that they also fix the portions of the winding connection lines 126 in the axial direction or restrict their freedom of movement in the axial direction.

Thus, an axial height 124 of the winding head 120 is substantially determined by an axial extension of the first and second winding portions 127, 128, respectively, whereby the height 124 of the winding head 120 can be precisely adjusted so that manufacturing tolerances of the stator 100, as well as other components of an electric machine in which the stator 100 is to be used, can be made smaller or narrower. As a result, the overall unused installation space can be saved.

Figure 2:
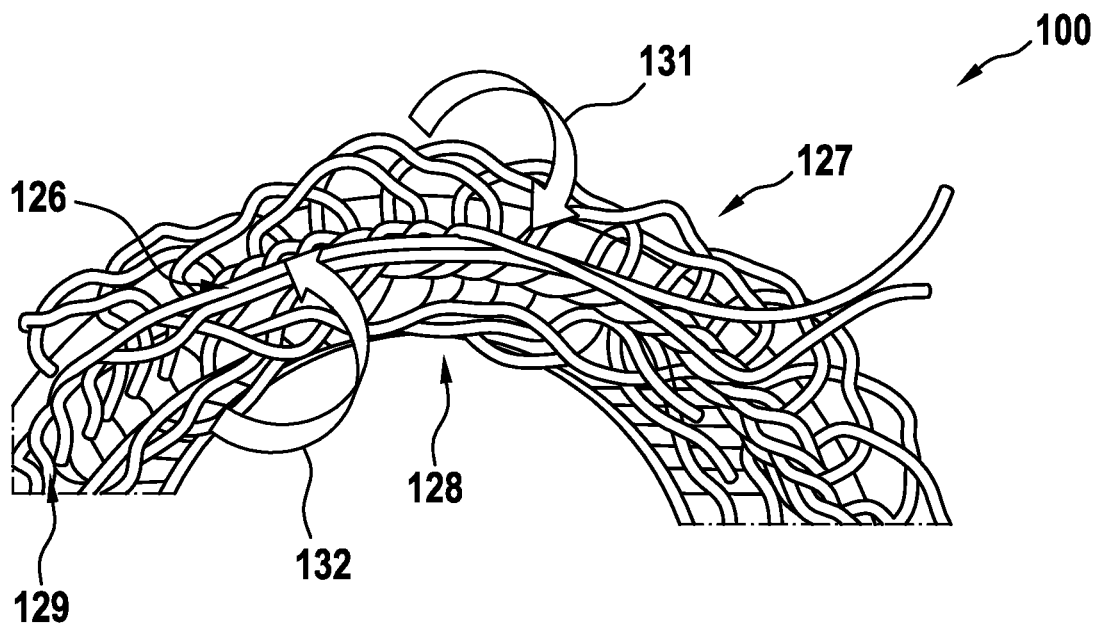
FIG. 2 illustrates an advantageous embodiment of a method according to the invention for producing a stator.

FIG. 2 illustrates an advantageous embodiment of a method according to the invention for producing a stator 100, as has already been discussed with reference to FIG. 1. For the sake of clarity, the same reference numerals have been used for identical features. These are not explained again here with reference to the statements above. FIG. 2 is a partial plan view of the stator 100 from the direction of the winding head 120.

When manufacturing the stator 100, the procedure can in particular be such that the first and second winding portions 127, 128 initially protrude beyond the stator core 102 substantially parallel to the axis 101 of the stator 100. If necessary, they can also be bent slightly outwardly (127) or inwardly (128) away from the axis in order to form a receiving opening for the portions 126. As a result, the region between the first 127 and second 128 winding portions remains accessible from the axial direction. Portions 126 of the winding connection lines are then laid between the first 127 and second 128 winding portions and on the further winding portions 129 in the circumferential direction—preferably along several stator slot widths—in the winding head 120. The first winding portions 127 are then bent in the region around their axial vertices in a radially inward direction 131, so that they restrict the portions of the winding connection lines which are laid in the circumferential direction in the winding head 120 in terms of their freedom of movement in a radially outward direction and at least partially cover them in the axial direction. Parallel to this or upstream or downstream in time, the second winding portions 128 are bent in a radially outward direction 132, so that they support the portions of the winding connection lines 126 which are laid in the circumferential direction in the winding head 120 in a radially inward direction and at least partially cover them in the axial direction. A lacquer or adhesive can then be applied to fix the structure or the winding head can be immersed therein.

As a result, the portions 126 of the winding connection lines are clamped between the first and second winding portions 127, 128 and are fixed in both the radial and axial directions. As a result of the arrangement on the further winding portions 129, the freedom of movement in the axial downward direction is also extremely limited, so that overall an almost play-free fixing of the portions 126 of the winding connection lines running in the circumferential direction is achieved.

This enables extensive automation and thus economization of the production process while at the same time reducing the necessary installation tolerances.

Figure 3:
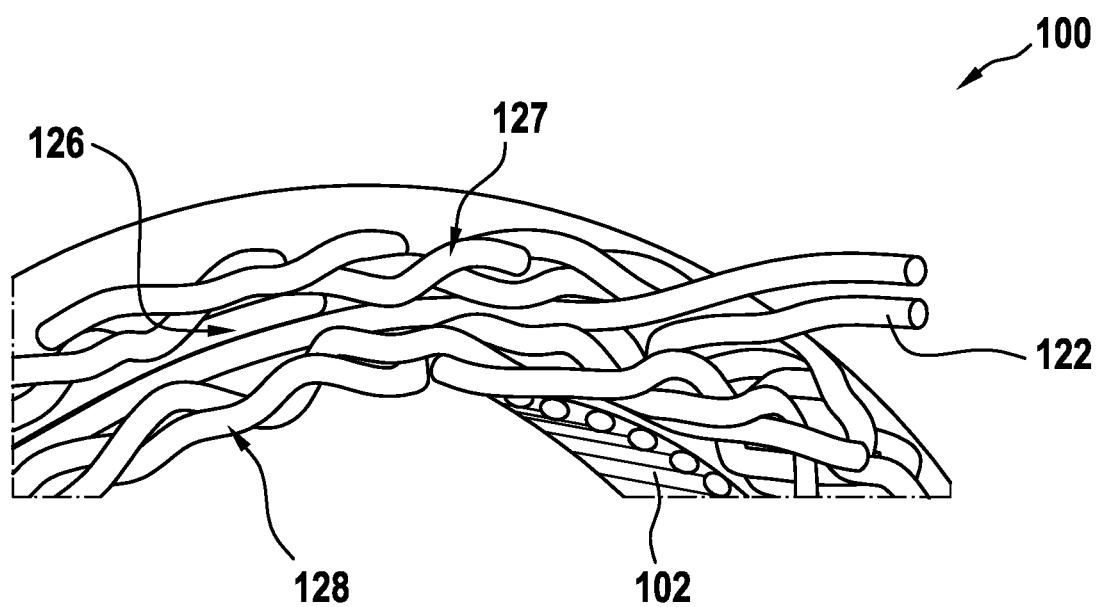
FIG. 3 shows a possible result of the method illustrated in FIG. 2.

FIG. 3 shows a possible result of an advantageous method for producing a stator, as has been explained with reference to FIG. 2. Here, FIG. 3 substantially corresponds to a partial plan view of the stator 100 from the direction of the winding head 120, which stator is shown in FIG. 1 in the form of a longitudinal section.

In FIG. 3, in comparison to the illustration in FIG. 2, it can be seen how the first and second winding portions 127, 128 partially cover the portions 126 of the winding connection lines in the axial direction and fix said portions radially. It can also be seen how connection portions 122 of the winding connection lines protrude from the winding head 120 in the axial direction. An essential advantage of the present invention is that these connection portions 122 have very little play in the radial direction compared to conventional production methods and therefore emerge at a defined position of the end winding 120. The connection portions can thus be connected to corresponding connection terminals of an electric machine (not shown), for example, by means of automated assembly tools, for example a welding or soldering robot.

The invention claimed is:

1. A stator for an electric machine comprising: a stator core and at least one winding which has a winding head protruding axially beyond the stator core, wherein the winding head comprises portions of the winding which form reversals of the winding wires, winding connection lines for energizing the winding and at least one radially outwardly arranged first set of winding portions and one radially inwardly arranged second set of winding portions spaced apart from the first set,
   wherein at least a portion of each of the winding connection lines runs in the circumferential direction, does not protrude axially beyond the first and the second sets of winding portions, and is arranged radially between and fixed by the first and the second sets of winding portions.

2. The stator for an electric machine-according to claim 1, wherein the at least a portion of the winding connection lines is fixed by the first and the second sets of winding portions in one or both of a radial and axial direction with respect to the stator.

3. The stator for an electric machine-according to claim 1, wherein the at least a portion of the winding connection lines is additionally fixed by at least one of sewing thread, yarn, a physically-binding bonding agent, and a chemically-binding bonding agent.

4. The stator for an electric machine according to claim 1, wherein the winding head has at least one further set of winding portions between the first set of winding portions and the second set of winding portions, wherein the at least a portion of the winding connection lines protrudes in the axial direction beyond the at least one further set of winding portions, but is arranged radially in the same plane as the at least one further set of winding portions.

5. The stator for an electric machine according to claim 1, wherein the at least a portion of the winding connection lines runs at least over two stator slot widths.

6. The stator for an electric machine according to claim 1, wherein the winding head has a variation of an axial height of at most 20%, 15%, 10% or 5% over the entire circumference of the stator.

7. The stator for an electric machine according to claim 1, wherein the at least a portion of the winding connection lines at no point protrudes radially outwardly beyond the first set or radially inwardly beyond the second set of winding portions.

8. The stator for an electric machine according to claim 1, wherein a winding wire from which the winding is made has a minimum cross-sectional area of more than 0.5 $mm^2$, 1 $mm^2$, 2 $mm^2$ or 4 $mm^2$.

9. The stator for an electric machine according to claim 1, wherein the at least the portion of the winding connection lines runs at least over 5°, 10°, 15° or 30° in the circumferential direction.

10. A method for producing a stator for an electric machine, wherein a winding is arranged in slots of a stator core, wherein a first set of winding portions, which protrudes in the axial direction beyond the stator core, is arranged radially outwardly, and a second set of winding portions, which protrudes in the axial direction beyond the stator core and is radially spaced apart from the first set, is arranged radially inwardly, wherein the first and second sets of winding portions comprise portions of the winding wires which form reversals of the winding wires, wherein portions of winding connection lines are arranged in the circumferential direction along the stator core between the first and the second sets of winding portions and wherein the first and the second sets of the winding portions are bent towards one another in order to fix the portions of the winding connection lines one or both of radially and axially with respect to the stator core.

11. The method for producing a stator according to claim 10, wherein the portions of the winding connection lines are additionally fixed by at least one of sewing thread, yarn, a physically-binding bonding agent and chemically-binding bonding agent.

12. The method for producing a stator according to claim 11, wherein the portions of the winding connection lines run at least over two stator slot widths.

13. The method for producing a stator according to claim 11, wherein the portions of the winding connection lines run at least 5°, 10°, 15° or 30° in the circumferential direction.

14. The method for producing a stator according to claim 11, wherein the portions of the winding connection lines at no point protrude radially outwardly beyond the first set or radially inwardly beyond the second set of winding portions.

15. The method for producing a stator according to claim 11, wherein a winding wire from which the winding is made has a minimum cross-sectional area of more than 0.5 $mm^2$, 1 $mm^2$, 2 $mm^2$ or 4 $mm^2$.

\* \* \* \* \*